US007962486B2

(12) United States Patent
Adair et al.

(10) Patent No.: US 7,962,486 B2
(45) Date of Patent: Jun. 14, 2011

(54) METHOD AND SYSTEM FOR DISCOVERY AND MODIFICATION OF DATA CLUSTER AND SYNONYMS

(75) Inventors: Gregery Gene Adair, Henderson, NV (US); Brand Lee Hunt, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 11/972,496

(22) Filed: Jan. 10, 2008

(65) Prior Publication Data

US 2009/0182755 A1 Jul. 16, 2009

(51) Int. Cl.
*G06F 17/30* (2006.01)
(52) U.S. Cl. ........................................ 707/737; 707/738
(58) Field of Classification Search .................. 707/737, 707/738
See application file for complete search history.

(56) References Cited

U.S. PATENT DOCUMENTS

| | | | | |
|---|---|---|---|---|
| 5,237,106 A * | 8/1993 | Babin et al. | ............ | 568/454 |
| 5,428,788 A * | 6/1995 | Schwanke | ............ | 717/120 |
| 5,819,258 A * | 10/1998 | Vaithyanathan et al. | ..... | 707/692 |
| 5,926,812 A * | 7/1999 | Hilsenrath et al. | ............ | 707/737 |
| 6,260,036 B1 * | 7/2001 | Almasi et al. | ............ | 707/688 |
| 6,295,529 B1 * | 9/2001 | Corston-Oliver et al. | .... | 707/715 |
| 6,446,061 B1 * | 9/2002 | Doerre et al. | ............ | 707/737 |
| 6,460,026 B1 * | 10/2002 | Pasumansky | ............ | 707/737 |
| 6,502,091 B1 * | 12/2002 | Chundi et al. | ............ | 707/738 |
| 6,581,058 B1 * | 6/2003 | Fayyad et al. | ............ | 707/737 |
| 6,671,680 B1 * | 12/2003 | Iwamoto et al. | ............ | 707/737 |
| 6,944,607 B1 * | 9/2005 | Zhang et al. | ............ | 707/737 |
| 6,944,612 B2 * | 9/2005 | Roustant et al. | ............ | 707/706 |
| 7,174,343 B2 * | 2/2007 | Campos et al. | ............ | 707/737 |
| 7,231,343 B1 | 6/2007 | Treadgold et al. | | |
| 2004/0024760 A1 | 2/2004 | Toner et al. | | |
| 2004/0034660 A1 | 2/2004 | Chen et al. | | |
| 2004/0064447 A1 | 4/2004 | Simske et al. | | |
| 2004/0133418 A1 | 7/2004 | Turcato et al. | | |
| 2004/0181759 A1 | 9/2004 | Murakami et al. | | |
| 2005/0033568 A1 | 2/2005 | Yu et al. | | |
| 2005/0065947 A1 | 3/2005 | He et al. | | |
| 2005/0080883 A1 * | 4/2005 | Nurminen et al. | ............ | 709/221 |
| 2005/0125215 A1 | 6/2005 | Wu et al. | | |
| 2006/0206306 A1 | 9/2006 | Cao et al. | | |
| 2006/0218136 A1 | 9/2006 | Surakka et al. | | |

OTHER PUBLICATIONS

Senellart, Pierre P., et al., "Automatic discovery of similar words," pp. 25-43.
Ruiz-Casado, Maria, et al., "Using context-window overlapping in synonym discovery and ontology extension," Department of Computer Science, Universidad Autonoma de Madrid, 7 pages.
International Search Report & Written Opinion for PCT/EP2009/050057, Dated Apr. 14, 2009.
A.K. Jain, et al. "Data Clustering: A Review," ACM Computing Surveys, vol. 31, No. 3 (Sep. 1999), pp. 264-273.

* cited by examiner

*Primary Examiner* — Don Wong
*Assistant Examiner* — Kim T Nguyen
(74) *Attorney, Agent, or Firm* — Patterson & Sheridan, LLP

(57) ABSTRACT

Discovery and modification of data clusters such as synonyms. In one aspect, a method for clustering data includes receiving information on a system, the information manipulating one or more data attributes stored or to be stored in a database accessible by the system, where the information and manipulation does not explicitly relate to data clusters. A data cluster is automatically adjusted based on the received information, the data cluster including multiple data attributes and including at least one of the data attributes manipulated by the received information. The data cluster is adjusted dynamically and in response to the information being received.

25 Claims, 5 Drawing Sheets

34

| SYNONYM ID | ENTITY ID |
|---|---|
| 1 | 1 |
| 1 | 2 |
| 2 | 4 |
| 2 | 5 |

| ACCOUNT ID | ENTITY ID |
|---|---|
| 1 | 1 |
| 2 | 2 |
| 3 | 2 |
| 4 | 5 |

FIG. 2B 30  40  42  44

| SYNONYM ID | ATTRIBUTE VALUE | ATTRIBUTE TYPE |
|---|---|---|
| 1 | 123 Main St. | address |
| 1 | 555-1212 | phone |
| 1 | IBM | employer |
| 2 | 456 First St. | address |
| 2 | Hewlett-Packard | employer |

| ATTRIBUTE ID | TYPE | VALUE | ACCOUNT |
|---|---|---|---|
| 1 | name | Jon Smith | 1 |
| 2 | address | 123 Main St. | 1 |
| 3 | phone | 555-1212 | 1 |
| 4 | employer | IBM | 1 |
| 5 | name | Jane Doe | 2 |
| 6 | address | 123 Main St. | 2 |
| 7 | phone | 555-1212 | 3 |
| 8 | employer | IBM | 2 |
| 9 | phone | 555-1111 | 2 |

FIG. 2D

METHOD AND SYSTEM FOR DISCOVERY AND MODIFICATION OF DATA CLUSTER AND SYNONYMS

FIELD OF THE INVENTION

The present invention relates to data clustering in computer systems, and more particularly to the discovery and modification of data clusters such as synonyms.

BACKGROUND OF THE INVENTION

Data mining includes the extraction of potentially useful information from data, such as data in a database. Clustering of data is often used in data mining and is the classification of data or attributes into different groups, i.e., the grouping of data into clusters, such that the data in each cluster share a common trait. For example, data clusters allow searching to be performed more efficiently, since the cluster can be searched instead of each individual attribute, thus reducing the number of search operations.

In some computing systems, certain data clusters can be called "synonyms," where a synonym can include a number of different data items that are all considered the same for search purposes or similar functions. The synonym can have a "root form" which is a default value of the synonym assumed when any of the associated data items are found. Synonyms can be useful in searching for and finding data that may not be an exact match to an input term. For example, searching for a particular name of a person will find exact matches to that name, and a synonym for that name can include variations of the name which can also be searched to find data related to the same person.

One standard way of utilizing synonyms in computing systems is to provide a synonym table that is a look-up table listing each root form word mapped to a cluster of words or data attributes (synonym words) associated with the root and all treated as having the same meaning. Typically, the known synonym words having the same meaning are pre-determined or pre-computed and stored in the synonym table for later use. When an input word is received, a matching synonym word or attribute is found by looking up the input word in the synonym table, which provides the root form word or synonym identifier.

One disadvantage with prior synonym use is that there exist synonym words for data that are non-obvious and/or difficult to pre-compute. For example, synonym words for a first name (root word) of Robert may be Bob, Bobbie, Bobby, Dobb, Rab, Rabbie, Robbie, Robby, Rob, Robard, Raibeart, Lopaka, and Lopeti, and not all of these variations may have been found or determined beforehand. Further, the formation and update of synonyms or other types of data clusters is typically performed at discrete times after all desired data is input, or at a time of a query, which can greatly slow queries made during that processing and potentially allows synonym data to be inaccurate or incomplete (drift) before updates are made.

In addition, the look-up table mapping a root to synonym words requires domain knowledge of the type of synonym so that accurate and complete lists of synonym words can be found for that type. For example, linguistics domain knowledge and techniques must be used to accurately find synonym words for a name or word, while other domain knowledge must be used to determine other types of synonyms such as numerical values. Furthermore, the storage of all the synonym words for a root can take an enormous amount of storage, since all known synonym words of each root are stored regardless of whether those synonym words are ever used, stored or searched by the system.

Accordingly, what is needed is an improved method and apparatus for forming and modifying data clusters (such as synonyms) that, for example, can update synonyms quickly and prevent drift in data accuracy, only requires the storage needed for synonym and attributes in use by the system, and/or requires no specific domain knowledge of the data. The present invention can address such needs.

SUMMARY OF THE INVENTION

The invention of the present application relates to the discovery and modification of data clusters such as synonyms. In one aspect of the invention, a method for clustering data includes receiving information on a system, the information manipulating one or more data attributes stored or to be stored in a database accessible by the system, and where the information and manipulation does not explicitly relate to data clusters. A data cluster is automatically adjusted based on the received information, the data cluster including multiple data attributes and including at least one of the data attributes manipulated by the received information. The data cluster is adjusted dynamically and in response to the information being received. A computer readable medium and system include similar features.

In another aspect of the invention, a method for clustering data includes receiving information on a system, the information including a plurality of received data attributes to be stored in at least one data entity in a database accessible by the system. One or more data clusters are modified based on the received information, each of the one or more data clusters including a plurality of data attributes and including at least one of the received data attributes, and where the modifying includes removing a particular data attribute from the one or more data clusters.

In another aspect of the invention, a method for discovering synonyms includes receiving information on a system, the information including a plurality of received data attributes associated with a particular data entity having data attributes stored in a database. The received data attributes are to be stored in one or more data entities stored in the database, where the information and data attributes do not explicitly relate to synonyms. A synonym is automatically formed based on the received data attributes and based on the currently stored data, the synonym including a plurality of the received data attributes associated with the data entity. The forming includes examining a plurality of candidate data entities in the database which include at least one of the received attributes, and the synonym is formed dynamically and in response to the information being received.

Embodiments in accordance with the present invention can provide dynamic data cluster and synonym discovery and modification that allows synonyms to be adjusted when non-synonym-related input data is received. This allows fast clustering and updates to be performed in real time without introducing drift in data. Furthermore, synonyms can be discovered without requiring specific domain knowledge and can include data attributes of different types, and storage cost can be reduced because only those attributes input and used by the system need be included in synonyms.

BRIEF DESCRIPTION OF THE FIGURES

FIGS. 2A-2D are diagrammatic illustrations of examples of tables that can be used in synonym processing of the present invention.

DETAILED DESCRIPTION

Figure 1:
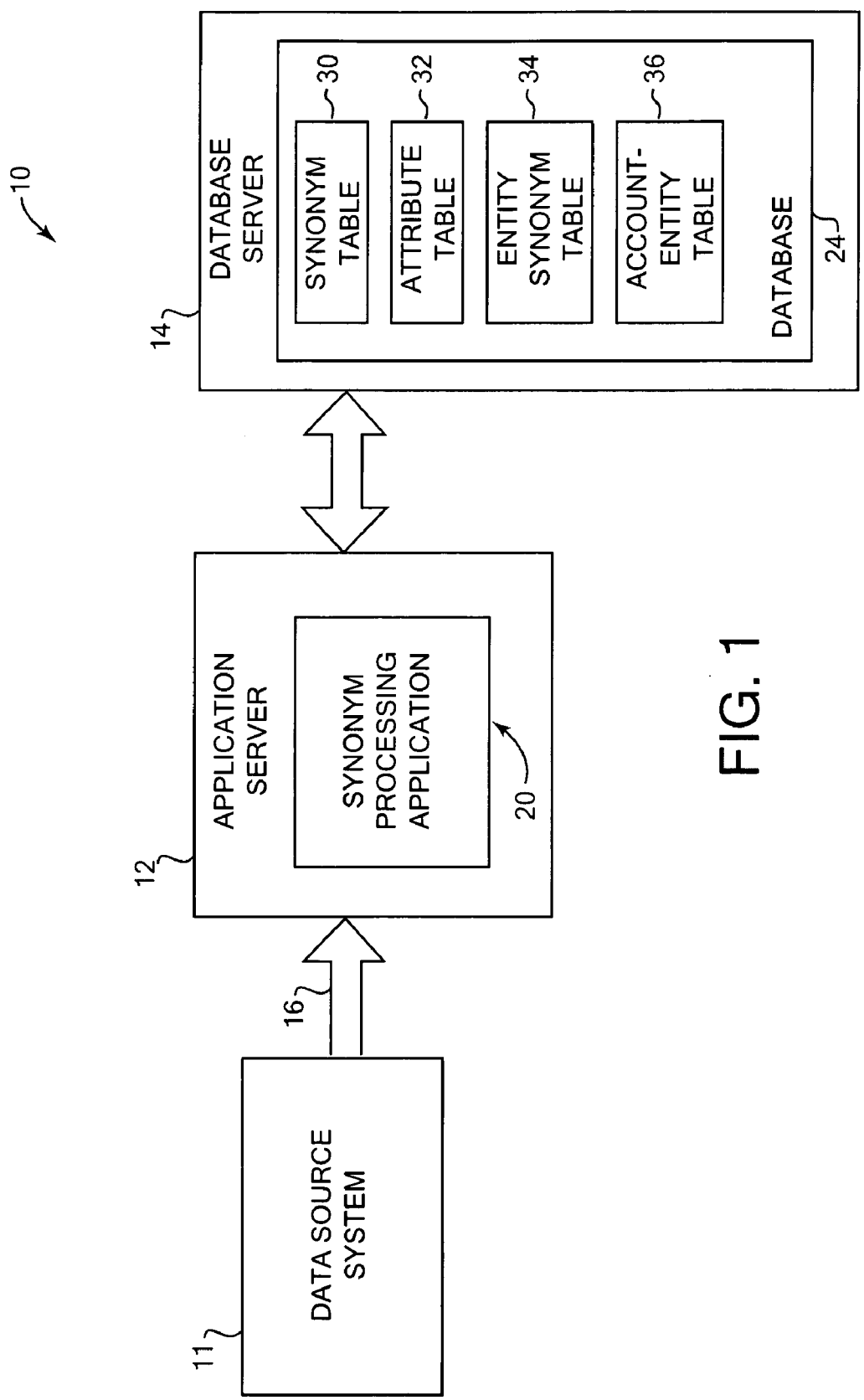
FIG. 1 is a block diagram of an example system suitable for use with the present invention.

The present invention relates to data clustering in computer systems, and more particularly to the discovery and modification of data clusters such as synonyms. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the system implementations usable with the present invention can take a number of different forms. The present invention will also be described in the context of particular methods having certain steps. However, the method and system operate effectively for other methods having different and/or additional steps not inconsistent with the present invention.

Embodiments of the invention can take the form of an entirely hardware embodiment, an entirely software embodiment or an embodiment containing both hardware and software elements. A software embodiment can include but is not limited to firmware, resident software, microcode, etc. Furthermore, embodiments of the invention can take the form of program instructions or code stored by a computer-readable medium for use by or in connection with a computer or any instruction execution system. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk (e.g., CD-ROM, DVD, etc.).

To more particularly describe the features of the present invention, please refer to FIGS. 1-5 in conjunction with the discussion below.

Methods and systems in accordance with the present invention are directed towards adjusting data clusters for a set of data, including forming new data clusters and modifying existing data clusters. The data clusters are called "synonyms" herein. The term "synonym" herein refers to a cluster, group, or association of two or more attributes, where these attributes have been grouped together in the synonym based on a sufficiently common occurrence or appearance together in data records, collections, or "entities" stored by the system 10. For example, a synonym can be advantageously used instead of the individual attributes to search for data candidates, thus reducing the number of search operations.

A method and system in accordance with the invention provides general real-time clustering of data at the time of the data's ingestion. Embodiments in accordance with the invention can be provided in several ways. For example, systems providing general real-time clustering of data can be used. A system having a two-phase search can also be in accordance with the present invention, where one phase of the search obtains candidate matches including false positives, and the second phase of the search scores or otherwise analyzes the candidates to narrow them further and/or confirm desired candidates. Furthermore, in a more specific application, an entity recognition and resolution system can be in accordance with the present invention, in which entities are found and different entities are compared to determine which entity is associated with input attributes. Candidate entities can be compared using a candidate list and the candidates are scored to confirm desired matches. The embodiments below are described in relation to an entity resolution system, but can be applied in other types of applications in other embodiments.

One example of a system suitable for use with such an entity analytics system is the Entity Analytic Solutions (EAS) from IBM Corp., including Relationship Resolution and Anonymous Resolution, which recognizes identities of people or other entities. The system resolves inconsistent, ambiguous identity and attribute information into a single resolved entity, such as a user or organization; detects non-obvious relationships between individuals and/or entities; and resolves fuzzy-like matching properties including the ability to recognize ambiguities, misspellings, or partial records within a data set.

FIG. 1 is a block diagram of an example system 10 suitable for use with the present invention. System 10 is implemented using one or more computer systems, electronic systems or devices. The example of system 10 can be implemented on well-known system hardware, including one or more microprocessors, memory (RAM, ROM, Flash memory, etc.), and various peripherals including storage devices (hard disk, optical storage such as DVD-ROM and CD-ROM), input devices (keyboards, pointing devices), output devices (monitors, printers) communication devices and networking devices, etc. In the example of FIG. 1, a data source system 11 can provide data to an application server 12 which can communicate with a database server 14. The system 10 can be implemented using other types of systems in other embodiments.

Data source system 11 provides information to the application server over a communication link 16. The data source system 11 may have itself received the information from different sources, such as a user inputting the data, a different system providing the data over a network, etc. In the examples referred to herein, the information includes data attributes that are associated with one or more "entities" or "data entities", where such an entity is a group, collection, or record in which data is grouped. An entity can represent a person, organization, object, subject, topic, etc. The entity has one or more data attributes associated with it, where in some embodiments the attributes can describe or relate to the entity. The entity and its attributes are stored and processed by the system 10. An entity can also have one or more different "accounts," which are different collections of data associated with the entity.

For example, an organization such as a bank may designate some kinds of entities as different persons or customers, where each customer can own different accounts, such as accounts to hold money or designate monetary status (a checking account, loan account, etc.). The attributes associated with the customer entity can be descriptive information for the entity, such as name, address, employer, telephone number, etc.

Application server 12 receives inbound information from the data source system 11 and can provide application program services and interfaces for the information and to requesting clients or other requesters. The application server can allow applications on the server to communicate with other dependent applications, such as other servers, database management systems, etc. With respect to the described embodiment of the invention, the application server 12 provides one or more synonym processing applications 20 in accordance with the present invention. For example, synonym application 20 can be run for a requesting client that is connected to the application server. Multiple synonym applications 20 can be run in parallel to provide more efficient processing of data. In other embodiments, the synonym application 20 can run on a client or database server.

Synonym application 20 can perform the synonym discovery and other processing of the present invention. This processing can include determining whether new synonyms are included in received inbound information, adding and deleting attributes to and from existing synonyms, and deleting synonyms. The processing also can include candidate processing for finding and processing other candidate entities having synonyms and/or similar attributes. These functions are described in greater detail below with respect to FIG. 3. In other embodiments, the synonym application functions can be incorporated in one or more different applications on the system.

Database server 14 can provide storage for information used in the present invention, and can be implemented using any of a variety of available different storage devices, such as hard disk, magnetic tape or other magnetic storage, CD, DVD, or optical storage, etc. With respect to the described embodiment of FIG. 1, the database server 14 provides access to a database 24 that stores a synonym table 30, one or more attribute tables 32, an entity-synonym table 34, and an entity-account table 36. Synonym table 30 stores a number of synonyms, where each synonym is labeled with a synonym identifier. Synonym table 30 stores a mapping of a synonym identifier to attributes associated with that synonym. Attribute table(s) 32 stores all the data attributes of entities in the system 10, and can also include information for types of attributes and associated accounts. The entity-synonym table 34 stores mappings of synonyms to the entities with which the synonyms are associated. In embodiments using accounts, the entity-account table 36 stores mappings of accounts to the entities with which they are associated. Examples of these tables are described in greater detail with respect to FIGS. 2A through 2D.

In alternate embodiments of the invention, some or all of the tables stored in the database 24 can be stored and accessed at other storage locations, such as storage local to the synonym processing application 20. In some alternate embodiments, the synonym application 20 can be run on the database server, or the data set for which the synonyms apply can be stored in storage local to the synonym application.

FIGS. 2A to 2D are diagrammatic illustrations of examples of tables which can be stored in the database server (or other system storage or memory) and can be used in synonym processing of the present invention. FIG. 2A shows an example of an entity-synonym table 34. In one column, synonym identifiers are stored to identify the different synonyms. In the other column, entity identifiers are stored which identify different entities, where an identified entity includes the synonym listed in the same row of the table. This table allows tracking of synonyms and entities and allows entities to be updated when various synonyms are updated.

FIG. 2B shows an example of an account-synonym table 36. In one column, account identifiers are stored to identify different accounts provided on the system. In the other column, entity identifiers are stored to identify the particular entity that is associated with the account in the same row of the table. In embodiments allowing multiple accounts for each entity, the table 36 can be used to associate the accounts with the proper entity.

FIG. 2C shows an example of a synonym table 30 for storing synonyms discovered by the present invention. In table 30, each data attribute in the table is associated with a particular synonym. Table 30 includes a synonym identifier column 40 for identifying a particular synonym. An attribute value column 42 stores the attribute value for an attribute that is being associated with the synonym listed in the same row of the table. An attribute type column 44 can be included in some embodiments that allow a type of attribute to be assigned to categorize attributes. The attribute type can be any designated type useful for the system and specified in the attribute table 32 (described below). In some cases, the attribute type can be useful in the synonym processing when searching for candidates, as described in greater detail with respect to FIG. 3. Each synonym provided in the table 30 (identified by a synonym ID) has two or more attributes (attribute values) associated with it, and thus needs at least two rows of storage in the example table 30. Other table organizations can be provided in other embodiments.

FIG. 2D shows an example of an attribute table 32 for storing data attributes associated with entities in system 30. In one column 46, an attribute identifier identifies each individual attribute. The type column 48 indicates the type of the attribute, if attribute types are being provided in a particular embodiment. For example, the table 32 shows four different attribute types of name, address, telephone number, and employer. Any types of attributes can be designated which can assist in categorizing the different attributes or limiting the search parameters for additional efficiency. In some embodiments, one attribute can also be a sub-portion of a distinct different attribute. For example, a zip code number can be its own attribute and can also be part of a separate address attribute.

The value column 50 indicates the value of the attribute. The term "value" or "attribute" herein is used to refer to a variety of different types of data. For example, a value can be a numeric value (integer, real, etc.), or text string including one or more alphanumeric or special characters. The account column 52 indicates the associated account identifier for the account that stores the attribute, if accounts are used in the particular embodiment used. In other embodiments not using accounts, the attribute table 32 can include entity identifiers in column 52 instead of account identifiers, which can be used to directly find entities that have particular attributes.

In other embodiments, the attribute table 32 can be implemented as two or more separate tables. For example, each table can include attributes only of one type, so that there is a table for name attributes, a different table for street address attributes, a different table for email address attributes, etc.

Figure 3:
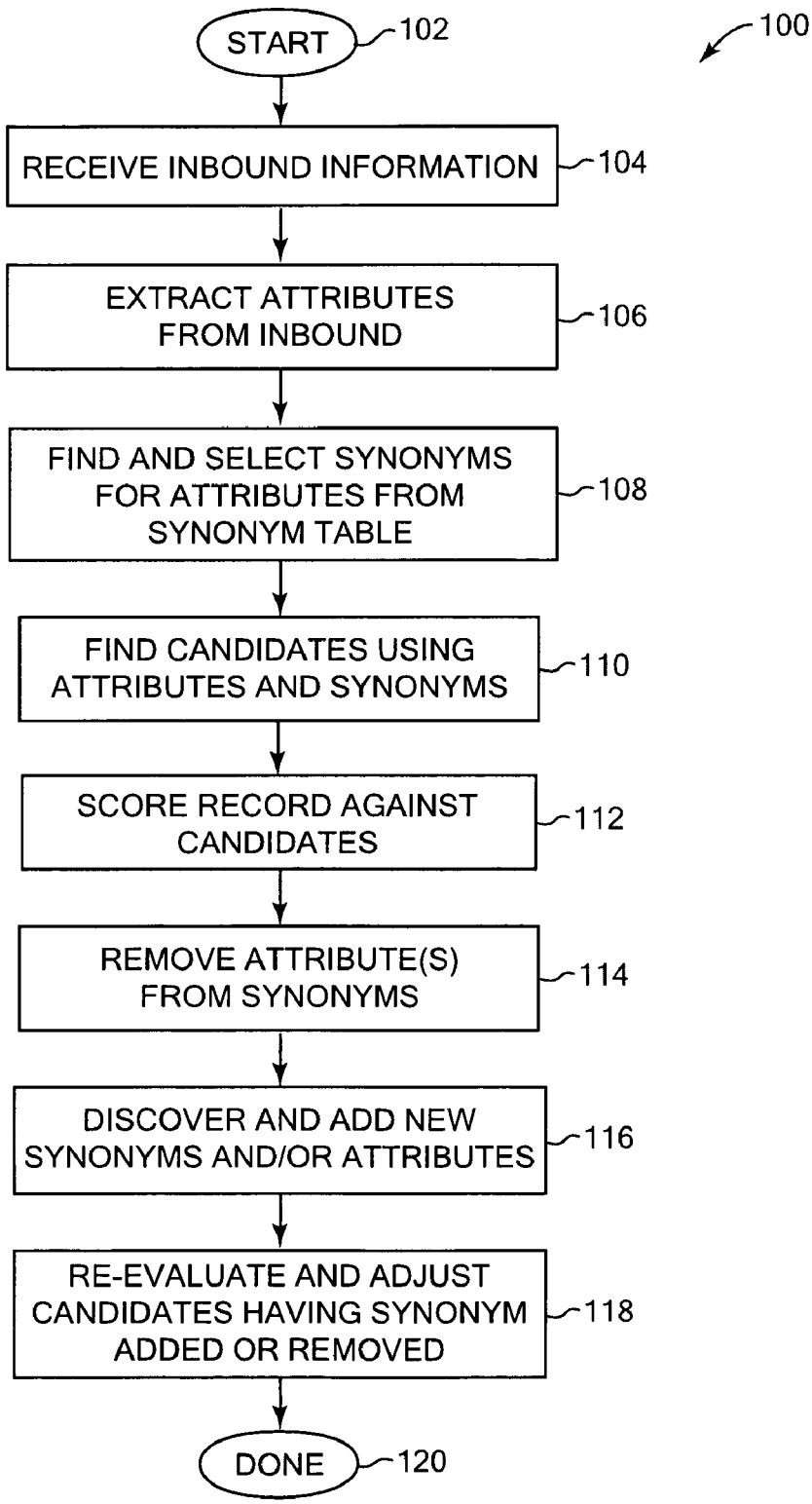
FIG. 3 is a flow diagram illustrating an embodiment of a method for synonym processing of the present invention.

FIG. 3 is a flow diagram illustrating an embodiment of a method 100 for synonym processing of the present invention. The methods described herein can be implemented in hardware, software, or a combination of both hardware and software. Method 100 can be implemented using program instructions provided on a computer readable medium, such as memory, magnetic tape, a magnetic disk, optical disk, etc. It should be noted that the process steps of the method described herein are only one embodiment, and these steps can be performed in a different order or in parallel (where appropriate), or combined in different ways in other embodiments.

The method begins at 102, and in step 104, inbound information (the "inbound" as referred to herein) is received. The inbound information manipulates one or more data attributes of the system. This manipulation can take any of a variety of different forms. For example, the inbound can insert data into the database interfaced by the database server 14 or into a different data set or other storage (all referred to as a "database" herein). Such inserted data can be data attributes, as described herein, included in the inbound. In some embodiments performing entity resolution or recognition, the inbound information can be a record that is a collection of data attributes input to the system and associated with one or more data entities recognized by the system 10. In one specific example application, the inbound can be a record including data attributes to be entered in a new account for a customer (the entity) at a loan department of a bank, where the record is associated with a loan application filed by the customer at the bank, and where the data attributes include a name, address, employer phone number, and employer of the customer.

The inbound can also manipulate existing data attributes of the system. For example, some embodiments can allow an inbound to also or alternatively instruct (via commands or instructions in the inbound information) that particular data attributes stored in the database or system be deleted. In some embodiments the inbound can be used to find existing data attributes or entities using a query. The inbound can be in any suitable format; for example, in one implementation, the inbound is in XML format.

In any case, the inbound is typically intended and is explicitly for manipulating data in the database (data insertion, deletion, comparison, etc.), such as for data entities or records, and the manipulation and data need not be specifically or explicitly related to synonyms or data clusters. For example, the inbound information does not even need to know of the existence of synonyms or data clusters on the system. Thus embodiments in accordance with the present invention can perform synonym/data cluster processing and adjustment automatically and dynamically without requiring specific input intended for or explicitly for such synonym adjustment.

In step 106, data attributes are extracted from the inbound. In some embodiments, these attributes describe or relate to one entity associated with the associated inbound (or in alternate embodiments, one or more such entities). For example, an inbound record to insert data about the loan customer described above can have separate attributes for the name, full address, phone number, and employer of the customer. The full address can be an attribute, and/or attributes can also be provided from portions of the work address in some embodiments, such as the state and zip code of the address. Attributes, once extracted, can be loaded into memory of the system 10.

In step 108, synonyms are found for the extracted attributes, where the synonyms are selected from the synonym table 30. The synonym table is queried to determine if any of the extracted attributes match any of the attribute values in the table, and if matches are found, the corresponding synonyms are selected which include those attributes. Each synonym in the table 30 has at least two attributes. In embodiments categorizing attributes into types, the inbound can include a type associated with each extracted attribute, and this type can be compared to the types of the attributes in the synonym table 30 to reduce the amount of searching. Each synonym in synonym table 30 can include attributes of any number of different types. For example, the type of an extracted attribute can be compared to the types of the attributes as listed in column 44 of the synonym table of FIG. 2C so that only corresponding attribute values in column 42 having the same type as the extracted attribute are compared to the extracted attribute. The selection of synonyms is repeated for each extracted attribute of the inbound. In a different embodiment not having types, an extracted attribute can be compared to each attribute in the synonym table 30. Other embodiments can use other methods to select synonyms that match one or more of the extracted attributes.

In step 110, candidate groups or entities are found and selected using the selected synonyms from the synonym table 30 and the set of extracted attributes. These candidate entities are referred to herein as "candidates", which are potential matches for an "inbound entity," i.e., an entity associated with the inbound (it may be unknown initially whether the inbound's information is to be added to an existing entity, or to a newly-created entity that is created by the inbound; in either case it is referred to as an inbound entity). The selected synonyms are used to find candidates as follows. For each synonym selected in step 110, all candidates are selected which share the selected synonym. This can be performed in the described embodiment by checking the entity-synonym table 34 to find a synonym identifier matching the selected synonym's identifier, and selecting the associated entity or entities that have the matched synonym. This is repeated for each selected synonym. This type of search, for example, allows a query to find candidate matches using each synonym, rather than having to perform a query using each attribute within each synonym or inbound.

The set of extracted attributes are also used to find candidates in step 110. There may be extracted attributes from the inbound that are not part of any synonym in the synonym table 30, and these non-synonym attributes are used to find and select additional candidates. For example, in the described embodiment each non-synonym attribute value is compared to the attribute values in table 32, and the account identifier in column 52 for matching attribute values is used to find the candidates that have those matching attributes using the account-entity table 36 of FIG. 2B (or other suitable table). In other embodiments not using accounts, entity identifiers in column 52 can be used to directly find the candidate entities that have the matching attributes. In some embodiments, some predetermined types of attributes can be excluded from the search for candidates.

Some embodiments may perform step 112, in which the inbound is scored against all the candidates found in step 110 using all extracted attributes, including attributes in synonyms. The method of attribute scoring can vary with attribute type, if desired. Any well known scoring method can be used to score the candidates based on the attributes and the synonyms in the candidates. For example, known similarity scoring techniques can be used as appropriate for different value types (such as names, addresses, phone numbers, etc.), e.g., number similarity scoring can take into account digit transposition or other common user input errors. Some embodiments can give a penalty to the score of candidates not sharing synonyms. After scoring is complete, it is known how closely the scored attributes match the attributes of the inbound and the scores can be used to provide more accurate candidates, e.g., the list of candidates can be narrowed to a desired smaller list or otherwise confirmed as matches. The scores may be used in other functions of the system 10, such as providing desired threshold matches or candidates, merging candidates (e.g., scores determining whether an inbound entity should merge with a candidate), splitting an entity (e.g., the inbound revealing that an inbound entity should split into one or more entities because the accounts that compose the entity are no longer considered a merge-able match), creating relationships for candidates, etc. In some embodiments, the actual merging and splitting of entities can take place immediately, since it can affect the addition and removal of synonyms as described below.

In step 114, the process determines and performs the removal of attributes from synonyms based on the inbound information and the candidate information. In the described embodiment, the removal includes removal based on attributes becoming generic, being deleted from the database, and/or based on candidates/attributes falling below a synonym formation threshold. Generic attribute detection includes determining whether any of the extracted attributes from the inbound now occur in so many different candidates that the attributes have become generic and therefore should not be used to find candidates and should not be part of synonyms. The deletion of attributes from one or more candidates or entities may occur, for example, based on direct instructions from the inbound or other source to delete one or more attributes from one or more particular candidates or entities in the system 10. Attributes falling below the synonym formation threshold can occur when the attributes of the inbound reduces a percentage number of candidates having synonym attributes, so that one or more attributes may have to be removed from an existing synonym. Attribute removal from synonyms is described in greater detail below with respect to FIG. 4.

In step 116, new synonyms (if any) are discovered and added to the system 10. This includes checking whether attributes qualify to form a synonym, adding new synonyms to candidates, and/or adding attributes to existing synonyms, and is described in greater detail below with respect to FIG. 5.

In step 118, the process re-evaluates and adjusts candidates that had at least one synonym added and/or removed in previous steps 114 and/or 116. All candidates that include an added or removed synonym should be re-evaluated to retain sequence neutrality, i.e., these candidates can be made up-to-date as quickly as possible so as to be suitable for the next operation involving the candidates. In the described embodiment, re-evaluation involves running the candidates through a resolution cycle in which steps 106 through 116 are performed for each such candidate. This allows each candidate to include the most recently updated synonyms and attributes associated with the synonyms. The process is then complete at 120.

In the described embodiment, the synonyms are processed as described above in real-time and dynamically in response to the inbound information being received by the synonym processing application. This allows synonyms and candidates to be updated upon data ingestion or reception, which can greatly speed up later queries based on the synonyms and candidates since no later data clustering need be performed.

Figure 4:
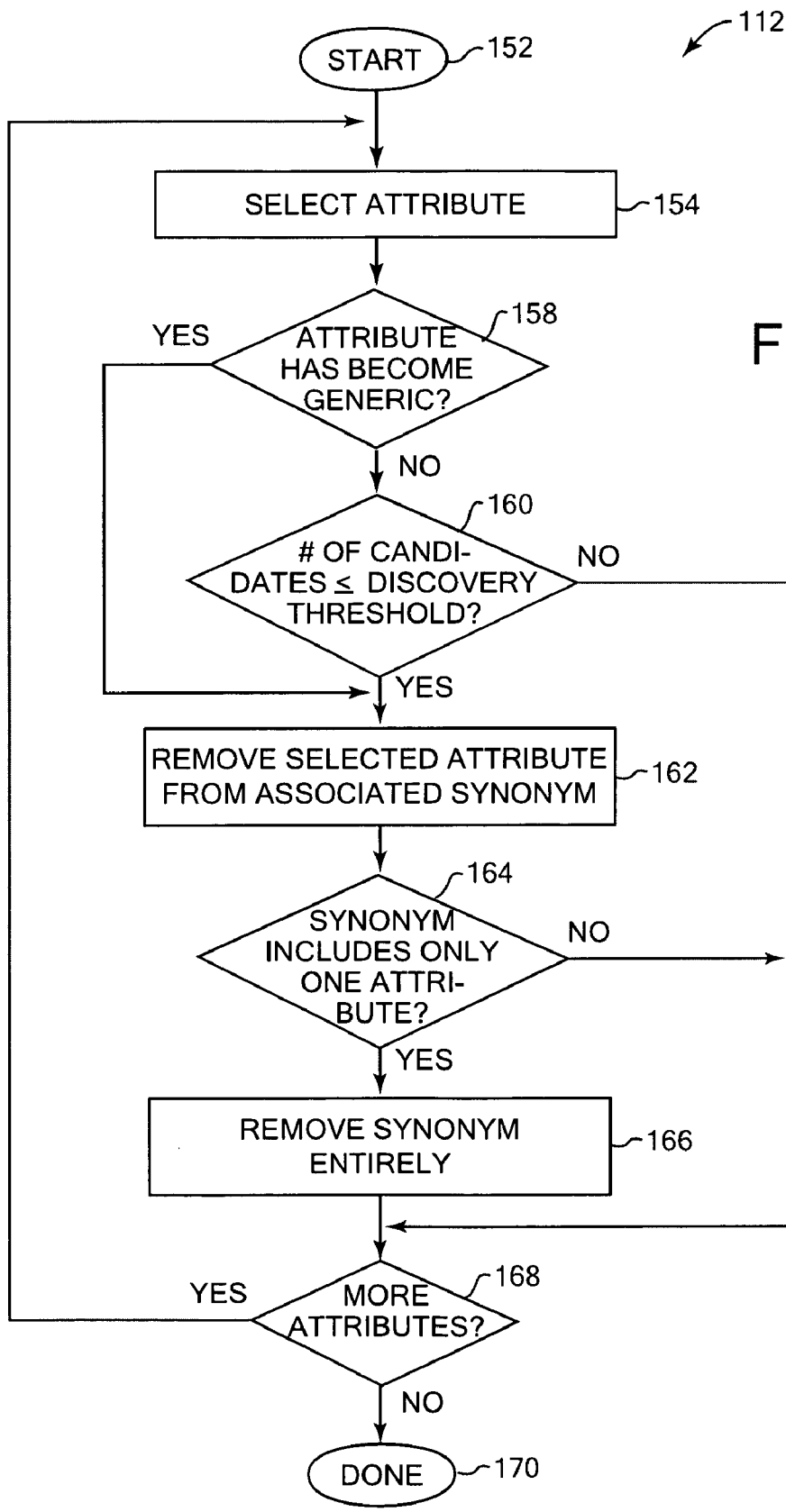
FIG. 4 is a flow diagram illustrating an embodiment of a method for implementing a step of FIG. 3 in which removal of attributes is performed based on the inbound information.

FIG. 4 is a flow diagram illustrating an embodiment of a method for implementing step 114 of FIG. 3, in which removal of attributes from synonyms is performed based on the inbound information. The removal of attributes from synonyms can be based on any of multiple different consequences caused by the inbound as described above, including attributes becoming generic, the deletion of attributes from a candidate or entity, and the reduction in frequency of attributes in one or more synonyms. In the case of deletion of attributes from candidates or entities, the actual deletion of the attributes from the data set can be performed before, during, or after the processing described for the present invention and is not described here.

The process starts at 152, and in step 154, one of the attributes in the inbound, or one of the attributes that was or will be deleted (if applicable), is selected. The selected attribute is included in at least one existing synonym. All the synonyms that include the selected attribute and all the candidates that include the selected attribute are known from previous steps.

In step 158, the process checks whether the attribute has become generic. Generic attribute detection includes determining whether the selected attribute now occurs in so many different candidates that it has become generic and therefore should not be used to find candidates and should not be part of synonyms. In the described embodiment, generics handling can include checking if the number of candidates (in the set of candidates found in step 110 of FIG. 3) that include the attribute exceeds a predetermined generics threshold. If this number of candidates exceeds the generics threshold, then the selected attribute is considered generic. Other processing can also or alternatively be performed to determine generic attributes. If the attribute is found to be generic, then the process continues to step 162 to remove the attribute from the synonym, as described below.

If the attribute is determined to not be generic, then process continues to step 160. In step 160, for each synonym including the selected attribute, the process checks whether the number of candidates having that synonym is now less than a synonym formation threshold percentage of all the candidates having the selected attribute (where the inbound entity is included as a candidate). The threshold percentage was used at some point previously to form the synonym, e.g., in step 204 or 208 of FIG. 5 as described in greater detail below. In one example, if the selected attribute in the inbound is part of an existing synonym but is not accompanied in the inbound by all the attributes of the synonym, the percentage of candidates having the full set of attributes in the synonym may have been reduced, such that the full set of attributes no longer qualifies as a synonym. For instance, if the inbound includes only the first two of three attributes included in the synonym, then there is now a lesser percentage of candidates that include the synonym having all three attributes. In another example, if the selected attribute is being deleted from one (or more) of the candidates, this may have reduced the number of candidates (and thus the number of occurrences) of the set of attributes making up the synonym, causing the threshold to no longer be met. (In the case of such deletion of attribute(s) caused by instructions in the inbound, the entity from which the attribute is deleted can be considered the inbound entity.)

If the synonym threshold is still exceeded, then the process continues to step 168, described below. If the discovery threshold is not exceeded, or if in step 158 the attribute was found to have become generic, then the process continues to step 162. In step 162, the selected attribute is removed from the associated synonym. This is performed, for example, by removing the selected attribute's entry and type from the associated synonym identifier in the synonym table 30. Alternatively, the attribute is marked/designated for removal from the synonym(s) at a different time.

In next step 164, the process checks whether each synonym that had any attributes removed in step 162 includes only one attribute after the removal. If not, the process continues to step 168, described below. If only one attribute is left in a synonym, then in step 166 the synonym is removed entirely, e.g., by removing the synonym entry and its attribute from the synonym table 30. Since a synonym having only a single attribute does not reduce the amount of searches in comparison to searching using the attributes, such a synonym is not needed and is removed.

In step 168, the process checks whether there are additional qualifying attributes that were not yet examined in the above steps. If so, the process returns to step 154 to select another attribute. If all such attributes have been processed, then the process is complete at 170.

Figure 5:
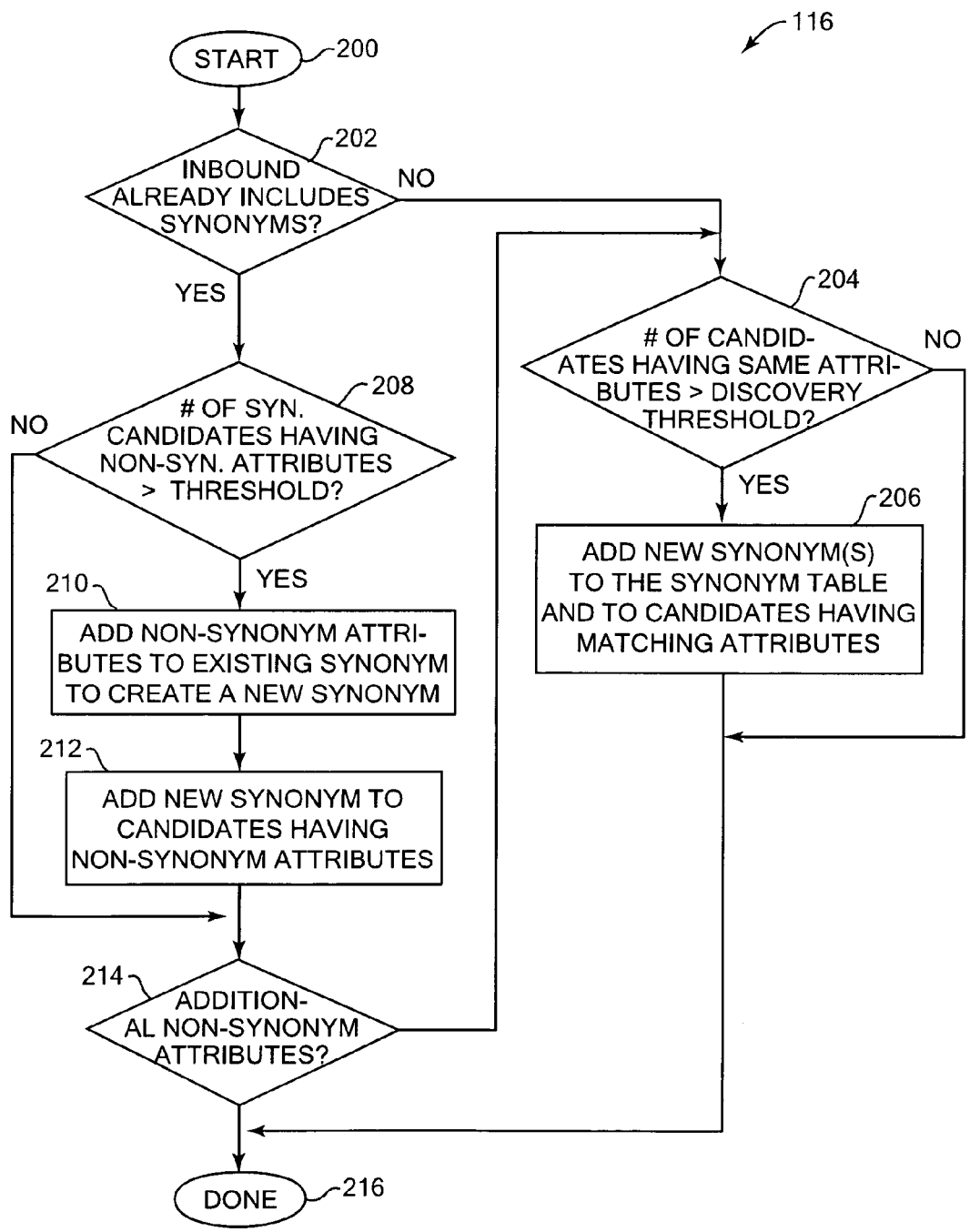
FIG. 5 is a flow diagram illustrating an embodiment of a step of FIG. 3 in which synonyms are discovered and added to the synonym table and to candidates.

FIG. 5 is a flow diagram illustrating an embodiment method for implementing step 116 of FIG. 3, in which synonyms are discovered and added to the synonym table and to candidates. The process starts at 200, and in step 202, the process checks whether the inbound already includes one or more synonyms as determined in step 108 of FIG. 3. If the data includes no synonyms, then the process continues to step 204, in which the process determines whether the inbound has two or more attributes that match these same attributes in a number of candidates that exceeds a predetermined synonym formation threshold percentage of all the candidates that include any of those two or more attributes being considered. The candidates used in the comparison include the inbound entity as a candidate. In the described embodiment, the process looks for an exact match between attributes. This step thus checks whether a group or set of the same attributes appear together often enough in different entities to be considered a synonym, i.e., these attributes have a shared association, in that they appear together in a number of entities. The synonym threshold percentage can be set by a user or administrator of the system, to a preferred level that allows less or more synonyms to be discovered, as desired.

For example, a synonym threshold is 70%, and out of 15 candidates found in step 110 of FIG. 3, 10 candidates have one or more of two particular attributes being considered. If the two attributes are found to appear at least 8 out of these 10 candidates (these candidates including the inbound), then the synonym threshold has been exceeded, and the two attributes are considered to be grouped together commonly enough when they appear to qualify as a new synonym.

In some embodiments, different combinations of the attributes can each be tested for new synonyms. For example, if the inbound has three attributes, it can be determined whether all three attributes appear in a number of candidates exceeding the threshold percentage, and it can also be determined whether each combination of two attributes out of the three appears in a number of candidates exceeding the threshold percentage. Thus multiple synonyms may be discovered from a set of attributes in the inbound, and synonyms may overlap in some of their attributes.

If the synonym threshold is not exceeded in step 204, then the process is complete at 216. If the inbound does have two or more attributes appearing in a number of candidates that exceeds the synonym threshold, then in step 206 one or more new synonyms made up of these attribute groups are created. In the described embodiment, adding a new synonym includes adding a new, unused synonym identifier to an entry in the synonym table 30 for each attribute in the new synonym, and assigning the associated attributes to the entries. If attribute types are being used, then the type of each attribute in the synonym can also be added to the synonym table 30.

In addition, in step 206 the new synonym is added to all the appropriate candidates, which are the candidates having the set of attributes that have been created as a new synonym. This can include adding the synonym to inbound entity(ies) created or added to by the inbound. In the described embodiment, the synonym is added to the candidates by adding the synonym identifier and associated candidate entity identifiers to the entity-synonym table 34. Multiple new synonyms can be added if different groups of attributes meet the threshold condition. The process is then complete at 216.

In some cases, a subset of attributes from one synonym may form one or more additional synonyms. For example, if four attributes in the inbound cause the synonym threshold to be exceeded, those four attributes are included in a first synonym and the first synonym is added to the appropriate candidates. It may also be that different candidates have only two of those four attributes, where the number of those different candidates is sufficiently large to allow a second synonym to be formed out of only those two attributes, and where the second synonym is added to those different candidates as well as to the candidates that include the first synonym.

In one example, four candidates have one or both of particular name or address attributes, candidates 1-3 all have both these name and address attributes, and the threshold percentage for synonym creation is 76%. Thus these attributes have not been formed into a synonym since they exist as a group in 75% of all the candidates and do not exceed the threshold. Inbound information is then received that inserts both of these same attributes to a new entity. This brings the number of candidates with these matching attributes to 4 out of 5 total candidates when including the inbound entity, which is 80% and exceeds the threshold, so that a new synonym with the two attributes is discovered and added to the table 30. In addition, each of the candidates 1-3 and the inbound entity created by the inbound have the new synonym added by adding their entity identifiers and the synonym identifier to the entity-synonym table 34.

Referring back to step 202, if the inbound already includes one or more existing synonyms, the process continues to step 208, in which it is determined if non-synonym attributes can be added to the existing synonym(s) to create expanded synonym(s). It is determined whether there are any attributes in the inbound that are not part of the existing synonym(s), and whether these non-synonym attributes match the non-synonym attributes appearing in a number of synonym candidates that exceeds the predetermined synonym threshold percentage of the candidates having one or more of the attributes being considered for the expanded synonym, i.e., having any attribute in the existing synonym or having the non-synonym attribute. Here, the "synonym candidates" are those candidates that already have the same synonym existing in the inbound; thus, the method compares the number of candidates having the original synonym plus the non-synonym attributes to the threshold percentage. As above, the number of candidates includes the inbound entity as a candidate. The discovery threshold percentage can be the same as used in step 204. In the described embodiment, the process looks for an exact match between attributes.

Thus, this process checks whether the inbound's insertion of one or more new non-synonym attributes causes the number of matching candidates for the non-synonym attributes to exceed the threshold. Similarly to step 204, in some embodiments, different combinations of the non-synonym attributes with the existing synonym(s) can be tested for exceeding the threshold, and multiple combinations may meet the threshold condition.

If the threshold is not met, then the process continues to step 214, described below. If the inbound has two or more non-synonym attributes appearing in a number of synonym candidates that exceed the discovery threshold, then in step 210 the non-synonym attributes are added to the appropriate existing synonym (i.e., the particular synonym in the inbound that also exists in the matching candidates) to create a new expanded synonym including the existing synonym plus the added attributes. In the described embodiment this is performed by adding the new attributes to the existing synonym identifier in the synonym table 30. If attribute types are being used, then the type of each attribute in the synonym can also be added to the synonym table.

In step 212, the new synonym is added to any candidates having the added attributes (and the existing synonym). In the described embodiment, the new synonym is added to the inbound entity (inbound candidate) (if appropriate) by adding the synonym identifier and inbound candidate entity identifier to the entity-synonym table 34. In a described embodiment using tables similar to those of FIGS. 2A-2D, the other matching candidates already stored in the system typically are already associated with the (now expanded) synonym in the table 34. The above steps can be repeated for every existing synonym in the inbound to which attributes can be added.

In step 214, the process checks whether there are any additional non-synonym attributes in the inbound, e.g., which did not meet the conditions of step 208 or which were not added to existing synonyms in step 210. Such non-synonym attributes may not have met the threshold conditions to be added to existing synonyms, but possibly may themselves meet the threshold conditions to form new synonyms. Thus, if there are such additional non-synonym attributes, the process continues to step 204, where these non-synonym attributes are tested whether they can form any new synonyms as described above for that step. The process is then complete at 216.

It should be noted that in other embodiments, the steps of the methods described above can be performed in a different order, can be performed concurrently where appropriate, and/or can be combined in different ways. For example, in FIG. 3, the removal of attributes from synonyms in step 114 can be performed concurrently with, or part of the process of, performing step 116 for discovery and adding of new synonyms. In FIG. 4, the checking of whether the synonym includes only one attribute of step 164 can be performed simultaneously with the removal of attributes in step 162. Furthermore, variations can be used in other embodiments, such as different types of synonym formation thresholds.

Embodiments of the present invention can advantageously use synonyms to search for matching or candidate data in a database, rather than performing a greater number of individual searches by searching with each individual attribute of input data; i.e., when any of the attributes are searched for, the entire synonym can be substituted. The synonyms described herein can be used in a wide variety of applications, including analytics, search engines, spell checkers, etc.

In addition, embodiments of the invention can provide synonyms or data clusters that are dynamically adjusted (including discovered and/or modified) in real-time and on the fly, as data is being ingested or inserted into a database and based on the data being inserted as well as the data already stored in the system. This allows synonyms to be constantly updated and re-evaluated for relevance to the current data of the system. In addition, all the entities that are relevant to a synonym can be updated in real-time, as input data is ingested, to keep the entity data up to date and to prevent entity drift. Such features allow a dynamic synonym table or dictionary to be maintained, and saves time over prior methods in which data clustering or synonym formation was performed based on static, stored data. For example, data clustering in data mining is typically very slow. However, if clusters are determined in real-time, during ingestion, as is possible in embodiments of the present invention, then queries can be performed later with greatly increased speed.

Furthermore, embodiments of the invention can provide synonym discovery without requiring specific domain knowledge. Thus, multiple types of attributes, of any type, can be collected in a single synonym and synonyms can be determined without needing to know similarity techniques for a certain type of data. The automatic synonym discovery described herein can be used not only for name components but any types of attributes, such as numbers, address components, colors, misspellings, etc. Further, when performing entity resolution, the increased amount of information and types of information that can be provided to an analyst about particular data when using the synonyms described herein can be extremely useful. For example, the system can inform a user that 90% of people who had an input address also shared a particular phone number.

In addition, embodiments of the present invention can greatly reduce the storage cost of a synonym table or dictionary since only data attributes used by the system at some point (for non-synonym-related processing) and stored by the system are used in synonyms. Thus, only synonyms that are relevant to the entities and data used and processed by the system need be stored, rather than using excessive storage space to pre-store large amounts of synonym attributes that are never needed because such attributes are never found in inbound data or stored by the database.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for clustering data, the method comprising:
receiving information on a system, the information including one or more data attributes, wherein the system is configured to manipulate data stored in a database based on the one or more data attributes in the information, the manipulation includes creating one or more data clusters and using the one or more data clusters to find one or more database entities that share at least one of the one or more data attributes, wherein the information and the manipulation do not explicitly relate to the one or more data clusters; and
automatically adjusting a data cluster in the database based on the one or more data attributes in the information, the data cluster including a plurality of data attributes and including at least one of the one or more data attributes included in the information, wherein the data cluster is adjusted dynamically in response to receiving the information,
wherein the data cluster is a grouping of selected data attributes of the one or more database entities in the database.

2. The method of claim 1, wherein the information includes the one or more data attributes to be stored in the database with stored data accessible by the system, wherein the adjusted data cluster is a new data cluster and the adjusting includes discovering and forming the new data cluster to include at least one of the one or more data attributes.

3. The method of claim 1, wherein the adjusted data cluster is an existing stored data cluster accessible by the system and the adjusting includes modifying the existing data cluster.

4. The method of claim 3, wherein the modifying includes removing at least one data attribute from the existing data cluster based on the information and based on a current data in the database.

5. The method of claim 4, wherein the removing includes determining that the at least one data attribute has become generic, wherein a data attribute becomes generic when the data attribute appears in more than a selected number of the one or more database entities.

6. The method of claim 1, wherein the data cluster is adjusted based on a current number of occurrences of at least one of the one or more data attributes in the database.

7. The method of claim 3, wherein a plurality of stored existing data clusters are accessible by the system, wherein the existing data clusters only include data attributes that were manipulated by past information received by the system, the past information not specifically related to data clusters.

8. The method of claim 7, wherein the existing data clusters are stored in a table and are modified dynamically in response to the information.

9. The method of claim 1, wherein the data cluster is a synonym data cluster for use in finding at least one candidate entity from a plurality of entities stored by the database, each candidate entity having a plurality of associated data attributes, wherein the synonym data cluster is an group of two or more data attributes that have appeared commonly together at more than one place in the database.

10. The method of claim 9, wherein the associated plurality of data attributes in the data cluster are of a plurality of different types.

11. The method of claim 1, wherein the adjusting the data cluster includes:
finding a plurality of stored existing data clusters that include at least one of the one or more data attributes;
finding a first plurality of candidate data entities in the database, that each include one or more of the existing data clusters;
finding a second plurality of candidate data entities that each include any of the one or more data attributes not included in the existing data clusters; and
determining whether a data attribute should be removed from the existing data clusters based on the first and second candidate data entities and the information.

12. The method of claim 11, wherein adjusting the data cluster further comprises determining that a plurality of received data attributes in the one or more data attributes form a new data cluster, wherein the plurality of received data attributes in the new data cluster appear in a threshold percentage number of the candidates that include at least one of the plurality of received data attributes, and further comprising adding the new data cluster to each of the candidate data entities that include the plurality of received data attributes.

13. The method of claim 11, wherein the adjusting the data cluster further comprises determining that at least one of the one or more data attributes is to be added to an existing data cluster, wherein the at least one added data attribute and existing synonym appear in a threshold percentage number of candidate data entities that include at least one of the one or more data attributes in the existing data cluster or include the at least one of the one or more data attributes to be added.

14. The method of claim 11, wherein determining whether any attributes should be removed from existing data clusters includes determining whether the number of candidate data entities has fallen below a threshold percentage number of candidate data entities based on the one or more data attributes.

15. The method of claim 11, further comprising adding a new data cluster or removing a existing data cluster from at least one adjusted candidate data entity, and evaluating data attributes of the at least one adjusted candidate data entity to check whether the at least one adjusted data cluster has updated data clusters.

16. A method for clustering data, the method comprising:
receiving information on a system, the information including a plurality of received data attributes to be stored in at least one of a plurality of data entities in a database accessible by the system, the at least one a plurality of data entities is selected based on an associative relationship between existing data attributes of the at least one data entity and the plurality of received data attributes; and
modifying one or more data clusters based on the information, each of the one or more data clusters including a plurality of data attributes and including at least one of the plurality of received data attributes, wherein the modifying includes removing a particular data attribute from the one or more data clusters,
wherein each of the one or more data clusters is a grouping of selected data attributes of one or more of the plurality of data entities stored in the database.

17. The method of claim 16, wherein the removing is performed in response to determining that the information reduces below a predetermined threshold a percentage of candidate data entities in the database that currently have the particular data attribute.

18. The method of claim 16, wherein modifying the one or more data clusters includes:
finding a plurality of stored existing data clusters that include at least one of the plurality of received data attributes;
finding a first plurality of candidate data entities in the database that include the existing data clusters;
finding a second plurality of candidate data entities that include any of the plurality of received data attributes not included in the existing data clusters; and
determining whether a data attribute should be removed from existing data clusters based on the first and second candidate data entities and the information.

19. A method for discovering synonyms, the method comprising:
receiving information on a system, the information including a plurality of received data attributes associated with a particular data entity having data attributes stored in a database, the plurality of received data attributes to be stored in one or more data entities stored in the database, wherein the information and the plurality of received data attributes do not explicitly relate to synonyms data associated with the one or more data entities; and
automatically forming a synonym based on the plurality of received data attributes and the synonyms data, wherein the forming includes examining a plurality of candidate data entities in the database which include at least one of the plurality of received attributes, and wherein the synonym is formed dynamically in response to the information, wherein the synonym is an group of two or more of the plurality of data attributes that have appeared commonly together at more than one place in the database, the synonym is different from any of the plurality of candidate data entities.

20. The method of claim 19, wherein the forming the synonym further includes determining whether the one or more of the plurality of received data attributes appear with other data attributes in different data entities sufficiently frequently to form a synonym from the one or more of the plurality of received data attributes.

21. A non-transitory computer readable medium storing program instructions to be executed by a computer and for clustering data, the program instructions performing steps comprising:

receiving information on a system, the information including one or more data attributes, wherein the system is configured to manipulate data stored in a database based on the one or more data attributes in the information, the manipulation includes creating one or more data clusters and using the one or more data clusters to find one or more entities in that share at least one of the one or more data attributes, wherein the information and the manipulation do not explicitly relate to the one or more data clusters; and automatically adjusting a data cluster in the database based on the one or more attributes in the information, the data cluster including a plurality of data attributes and including at least one of the one or more data attributes included in the information, wherein the data cluster is adjusted dynamically and in response to receiving the information, wherein the data cluster is a grouping of selected data attributes of the one or more database entities in the database.

22. The non-transitory computer readable medium of claim 21, wherein the adjusted data cluster is a new data cluster and the adjusting includes discovering and forming the new data cluster to include at least one of the data attributes.

23. The non-transitory computer readable medium of claim 21, wherein the adjusted data cluster is an existing stored data cluster accessible by the system and the adjusting includes removing at least one data attribute from the existing data cluster based on the information and based on current data in the database.

24. The non-transitory computer readable medium of claim 21, wherein the data cluster is adjusted based on a current number of occurrences of at least one of the one or more data attributes in the database.

25. A system for clustering data, the system comprising:

a database storing a plurality of database entities, each of the plurality of database entities including a plurality of stored data attributes;

an application server including a synonym processing module, the synonym processing module is configured to receive information on a system, the information includes a first plurality of data attributes, the synonym processing module is further configured to manipulate data stored in the database based on the first plurality of data attributes, the synonym processing module is configured to create one or more data clusters and using the one or more data clusters to find one or more database entities in the plurality of database entities that share at least one of the plurality of stored data attributes, wherein the information and manipulation do not explicitly relate to the one or more data clusters; and the synonym processing module is further configured to automatically adjust a data cluster based on the received information, the data cluster including a second plurality of data attributes and including at least one of the first plurality of data attributes included in the received information, wherein the data cluster is adjusted dynamically in response to the received information, wherein the data cluster is a grouping of selected data attributes of the one or more database entities in the database.

* * * * *